Patented Sept. 12, 1933

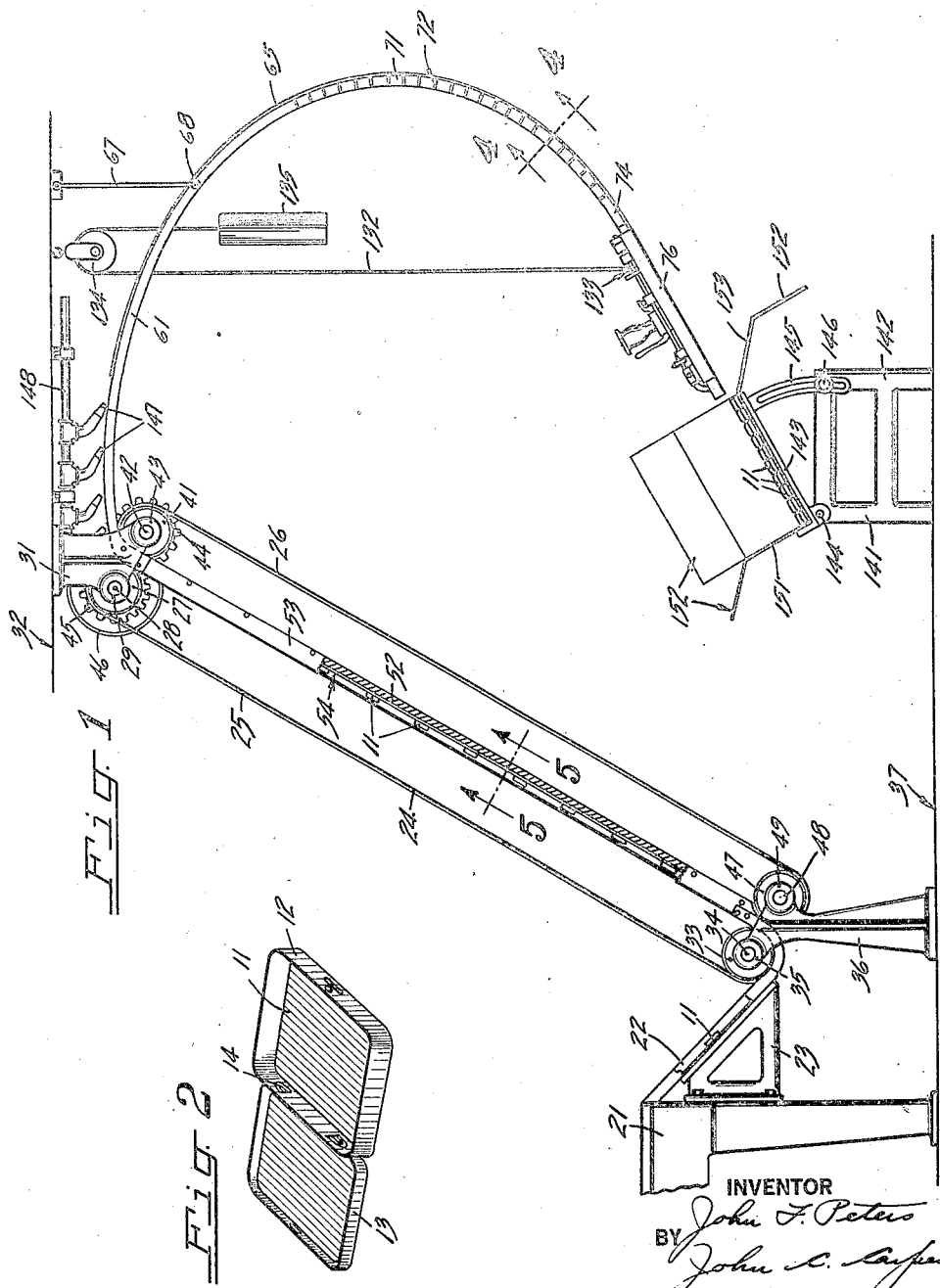

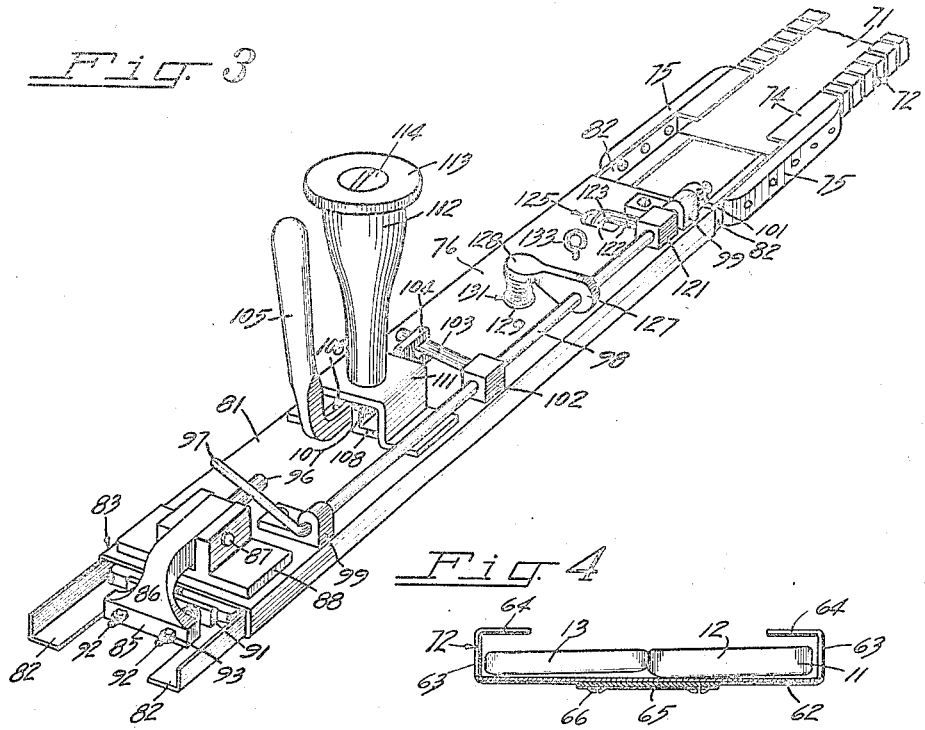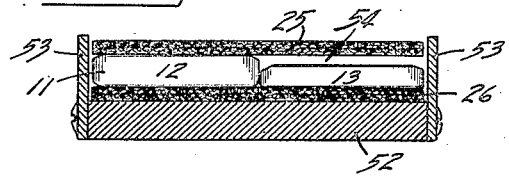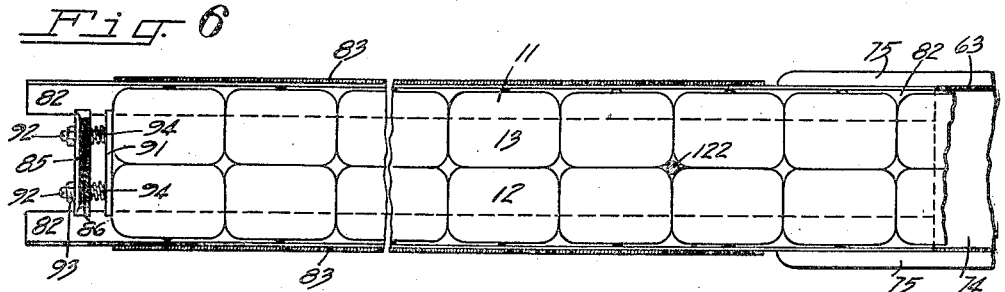

1,926,060

UNITED STATES PATENT OFFICE 1,926,060

CONTAINER LOADING APPARATUS

John F. Peters, Leonia, N. J., assignor to American Can Company, New York, N. Y., a corporation of New Jersey Application April 24, 1931. Serial No. 532,401

12 Claims. (Cl. 226—14)

The present invention relates to a container loading apparatus and has more particular reference to an apparatus for conveying containers through a flexible runway and loading tool connected therewith and into packed position within a carton or box.

The principal object of the present invention is the provision of an apparatus for segregating predetermined quantities of containers and packing them in alignment within cartons or boxes.

An important object of the invention is the provision of a flexible runway for supplying containers to packing elements of a loading apparatus.

A further important object of the invention is the provision of a flexible runway for conveying containers to a loading tool secured to one of its ends wherein a predetermined quantity of containers are segregated from a supply of containers and packed into cartons.

The invention contemplates, in a loading apparatus, the provision of an elevator or feeding device for supplying a quantity of containers to the upper end of a runway from which the containers are fed by gravity, assisted by compressed air, to a loading tool which segregates a predetermined quantity of containers from the runway supply and packs them into cartons.

Numerous other objects of the invention will be apparent as it is better understood from the following description, which, taken in connection with the accompanying drawings, discloses a preferred embodiment thereof.

Referring to the drawings:

Figure 1 is a side elevation of an apparatus embodying the present invention, parts being shown in section and parts broken away;

Fig. 2 is an enlarged perspective view of a container adapted for loading and packing by the apparatus used to exemplify the present invention;

Fig. 3 is an enlarged perspective view of the container loading tool;

Fig. 4 is an enlarged transverse sectional view of the loading runway taken substantially along the line 4—4 in Fig. 1;

Fig. 5 is an enlarged transverse sectional view taken substantially along the line 5—5 in Fig. 1; and Fig. 6 is a longitudinal sectional plan view of the container loading tool.

For the purpose of exemplifying the present invention there is disclosed in the drawings a specimen container designated by the numeral 11 (Fig. 2). Such a container comprises a body 12 which may be provided with a hinged cover 13 secured thereto by a hinge 14.

The container 11 may be manufactured and assembled in a machine designated by the numeral 21 from which it is discharged with the cover 13 in open position. From the machine the container falls into a chute 22, carried by a bracket 23 attached to the end of the machine and into an elevator or feeding device 24.

This feeding device comprises two endless belts 25, 26, between which the containers are conveyed the former passing at its upper end over a pulley 27 mounted on a driving shaft 28 journaled in bearings 29 formed in a bracket 31 attached to any stationary object as a ceiling 32. The belt 25 extends at an angle from the vertical and passes over an idler pulley 33 adjacent the end of the chute 22. This idler pulley is mounted on a shaft 34 journaled in bearings 35 formed in a bracket 36 mounted on a stationary part as on a floor generally indicated by the numeral 37.

Parallel to and directly beneath the lower run of the belt 25 is positioned the belt 26 which passes over and is driven by a pulley 41 mounted on a shaft 42 journalled in bearings 43, also formed in the bracket 31. The pulley 41 is driven by a gear 44 mounted on the shaft 42 adjacent the pulley, the gear 44 meshing with a driving gear 45 mounted on the shaft 28. A driving pulley 46 is mounted on the shaft 28 adjacent the gear 45 and receives driving power from any suitable source. Through the medium of the gears 44, 45, therefore, the belts 25, 26 move in unison. At the lower end of the elevator, the belt 26 passes over an idler pulley 47 mounted on a shaft 48 journalled in bearings 49 formed in the bracket 36.

The upper run of the belt 26 passes along and is supported by a stationary plate 52 (Figs. 1 and 5) having side plates 53 defining a channel or guideway 54. The plates 52, 53 are secured, at their upper ends, to the bracket 31 and at their lower ends to the bracket 36. This lower connection is in line with the chute 22.

A runway 61 connects with the upper end of the feeding device and receives and further conveys the containers. This runway 61 is secured to the bracket 31, its entrance end being in alignment with the exit end of the guideway 54. This runway (see also Fig. 4) comprises a plate 62 having opposite edges bent at right angles into side guides 63 which in turn connect with right angled terminal guide walls 64. A strap 65 is secured to the outer side of the plate 62 by screws 66 and reinforces the runway while permitting flexibility in certain of its parts. A tie bar 67 hung from the ceiling 32 connects at 68 to the runway 61 and holds it in suspended position so that the runway may move as required by the movement of the packing device, without resistance to such movement. Substantially half of the runway 61 is held stationary by the suspension referred to but its lower half is movable in different positions for a purpose hereinafter described. This lower half of the runway is formed as a flexible runway section 71, the side edges of the runway being cut at regular intervals into slots 72 which extend through the side and top guide members 63, 64 as shown in Fig. 4.

This flexible section 71 at its lower end joins with a nonflexible solid section 74 secured by side straps 75 to a container loading tool, generally indicated by the numeral 76, and into this loading tool the containers pass.

The container loading tool 76 (Fig. 3) comprises a rectangular, tubular body member 81 enclosing parallel angle irons 82 spaced along opposite sides and adapted to guide the containers through the tubular body of the tool. It is the entrance ends of the angle irons 82 as they project beyond the body member 81 that provide connection between the tool body and the side straps 76 previously described. At the opposite or exit end of the tool body the angle irons 82 extend beyond the body member and serve as a container discharge or exit chute.

A gate 85 is located at the forward or discharge end of the tool and is adapted to move into a position midway between the angle iron track 82 and directly in the path of the containers passing therealong. The gate is formed with a curved neck portion 86 mounted for oscillation on a pin 87 journalled in a bracket 88 carried on the upper surface and at the forward end of the body member 81.

A striking plate 91 (see also Fig. 6) is mounted on pins 92 which extend through and are held in the gate 85 by nuts 93, springs 94 surrounding the pins 92, being interposed between the gate 85 and the plate 91. This construction provides a flexible stop against which the containers strike as they move forward through the runway and causes them to come to rest without damage when the gate is interposed in their path of travel.

To remove the gate 85 from stopping position it is pivoted on its pin 87. For this purpose a pin 96 projects rearwardly from the neck portion 86 of the gate and is in the path of an arm 97 extending at right angles as an integral part of a shaft 98, journaled in brackets 99 mounted on the top of the body member 81. A collar 101 pinned to the rear end of the shaft 98 prevents any longitudinal movement thereof while permitting oscillation in its bearings. Intermediate the brackets 99 and secured to the shaft 98, is a block 102 which carries a pin 103 engaged by a bifurcated end 104 of an operating lever 105.

The lever 105 oscillates on a pin 107 which is journalled in brackets 108 mounted on the upper surface of the body member 81. A bridge or bracket 111 extends over the lever 105 and the brackets 108 and is mounted upon the body member. This bridge carries an upwardly extending handle 112 provided with a washer 113 secured to its upper end by a screw 114. The handle 112 is shaped to conform to the hand of an operator who in this way may easily hold and move the loading tool to the desired positions for dispensing the containers into their cartons. The lever 105, as shown in Fig. 3, is within easy reach of the operator's fingers as he supports the tool and manipulation of the lever can thus be had to raise the gate 85 for this discharge of the containers.

Provision is made in the loading tool for segregating a predetermined quantity of containers from the supply within the runway so that only this exact number of containers is dispensed from the tool at each individual discharge operation. For this purpose a block 121 is mounted on the rear end of the shaft 98 and carries a laterally extending pin 122 bent at right angles at 123 to extend downwardly into the interior of the body member 81 through a slot 125 formed in the upper body wall.

A laterally extending lever 127 is secured to the shaft 98, intermediate the blocks 102, 121 and is formed with a flat head 128. A spring 129 is positioned beneath this head and rests in a recess 131 formed in the upper surface of the body member 81 and tends to hold the arm 97 away from gate opening position and to hold the pin 122 in elevated position and out of the path of the container passing through the tool body 81 and along the angle iron tracks 82.

The operator is not required to support the entire weight of the loading tool 76 and the flexible section 71 of the runway, but these parts are counter-weighted as illustrated in Fig. 1. A wire 132 is secured at its lower end to an eye-bolt 133 projecting from the body member 81. This wire passes over a pulley block 134 held by a hook projecting from the ceiling 32 and its end connects with a counterbalance 135.

To more easily support the carton or box into which the containers are packed a table 141 may be provided, having legs 142 and an adjustable top 143 pivoted thereto at 144. The angular position and elevation of the table may be easily adjusted by means of slotted arcuate extensions 145 clamped in place on the table by lock nuts 146. The table 141 is adapted to hold a suitable carton or box 151 which may be placed on the elevated table top with folded top flaps 152 open and an end 153 folded down to allow for filling.

In operation, the containers 11 (Fig. 1) as they pass from and through the chute 22 are lifted in progressive order by the elevator or feeding device, being engaged between the lower run of the belt 25 and the upper run of the belt 26 with their open sides up. From the elevator they are discharged one behind the other into the runway 61, the containers leaving the elevator forcing the preceding containers into the mouth of the runway.

At this position compressed air is preferably directed into the runway by nozzles 147 secured to a pipe 148 connecting with any suitable source of compressed air supply. These nozzles project blasts of air into the open containers and forcibly propel them, first through the upper section of the runway 61 and thence through the curved flexible portion 71. They are assisted in this movement by gravity and pass into the loading tool 76 where further travel is stopped by the flexible stop gate parts at that time interposed in their path.

The operator in using the loading tool preferably positions it into the carton or box and over the spot where the containers are to be placed and actuates the lever 105, slowly withdrawing the tool as he does so. This action forces the end of the pin 122 downwardly and into the interior of the body member 81 between adjacent containers therein (Fig. 6), thereby segregating a predetermined number. This segregated number is determined by the distance between the pin 122 and the gate 85 and may be a number which will just place one row of containers lengthwise of the carton.

Simultaneously with the lowering of the pin 122 the gate 85 is lifted and the segregated containers slide by gravity from the tool, the withdrawing of the same aligning them in proper packed position. This operation is repeated for subsequent rows of containers and for the different layers necessary to completely fill the carton, the operator at all times shifting the tool laterally or vertically as desired. Each release of the handle 105 permits filling of the tool and each tripping thereof effects segregating and discharging of the desired quantity of containers.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container loading mechanism for packing containers into cartons comprising in combination, a runway for conveying the containers, and a loading tool associated with and forming the terminal of and movable with the said runway for dispensing the said containers into said cartons, said tool being movable in vertical and sidewise directions relative to the cartons, while connected with said runway, for depositing rows of separate articles within the cartons.

2. A container loading mchanism for packing containers into cartons comprising in combination, a runway for conveying the containers, a feeding device for delivering the said containers into the said runway, and a loading tool connected and movable with the said runway crosswise to the line of feeding for dispensing the said containers into said cartons.

3. A container loading mechanism for packing containers into cartons comprising in combination, a runway for conveying the containers, a feeding device for delivering the said containers into the said runway, and a manually operated loading tool connected with the said runway and receiving a row of articles therefrom, and movable crosswise to the line of feeding for dispensing a predetermined quantity of the containers into said cartons.

4. A container loading mechanism for packing containers into cartons comprising in combination, a horizontally and vertically flexible runway for conveying the containers, and a loading tool connected to and supported by and movable with the end of the runway and movable into different positions for aligning the said containers into said cartons.

5. A container loading mechanism for packing containers into cartons comprising in combination, a horizontally and vertically flexible runway for conveying the containers, a feeding device for delivering the said containers into the runway, and a manually operated loading tool connected to and supported by the end of the runway and movable into different positions for aligning the said containers into said cartons.

6. A container loading mechanism for packing containers into cartons comprising in combination, a runway for conveying the containers, a feeding device for delivering the said containers into said runway, means associated with the said runway for propelling the containers therealong, and a loading tool connected and movable with the said runway for dispensing the said containers into said cartons.

7. A container loading mechanism for packing containers into cartons comprising in combination, an elevating conveyer and a runway for conveying the containers, pneumatic means associated with the said runway having forwardly directed nozzles at the juncture of said conveyor and runway for directing air blasts against the containers and propelling them on said runway, and a loading tool connected to the said runway for dispensing the said containers into said cartons.

8. A container loading mechanism for packing containers into cartons comprising in combination, a flexible runway for conveying the containers, a loading tool connected with the end of said runway for dispensing the said containers into said cartons, and horizontally movable means for suspending and balancing the said runway and tool for supporting the tool and the end of said runway in manipulated position and so that said runway and tool may be swung from row to row of a carton.

9. A container loading tool horizontally and vertically movable to any desired position relative to a carton for packing rows of containers into cartons, comprising in combination, guide bars forming a passageway for the containers, a gate associated with said guide bars and movable into position to block off the said passageway, and means associated with the said gate for moving it into non-obstructing and container dispensing position.

10. A container loading tool for packing containers into cartons and adapted to be connected with a chute and to be manipulated at an open carton in horizontal and vertical directions, comprising in combination, guide bars forming a passageway for the containers, a yielding gate associated with said guide bars for blocking off the said passageway, means for segregating a predetermined quantity of containers while in the said passageway, and means associated with the said gate for moving it out of obstructing position during delivery of said predetermined quantity of containers from said passageway.

11. A container loading mechanism for packing containers into cartons, comprising a loading tool manually movable in horizontal and vertical directions from row to row and layer to layer as a carton is filled, a conveyor delivering containers to a fixed discharge point, and means movable with said tool for transferring said containers from said fixed discharge point to said tool in its several positions in loading.

12. A container loading mechanism for packing containers into cartons, comprising in combination a loading tool adapted to contain a segregated charge of containers sufficient in number to constitute a row of containers in said carton and manually operable along the carton to discharge the containers in packed position, and means movable with said tool for delivering containers to said tool.

JOHN F. PETERS.